July 29, 1969 T. M. BUCK ET AL 3,458,782

ELECTRON BEAM CHARGE STORAGE DEVICE EMPLOYING DIODE ARRAY AND ESTABLISHING AN IMPURITY GRADIENT IN ORDER TO REDUCE THE SURFACE RECOMBINATION VELOCITY IN A REGION OF ELECTRON-HOLE PAIR PRODUCTION

Filed Oct. 18, 1967

FIG. 1

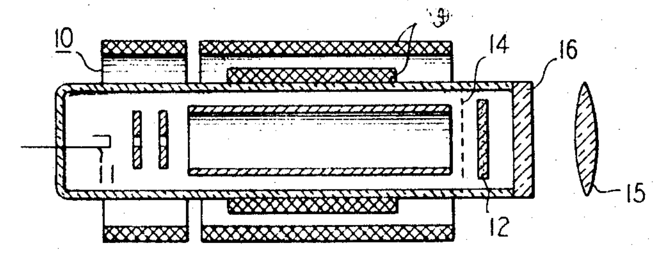

FIG. 2

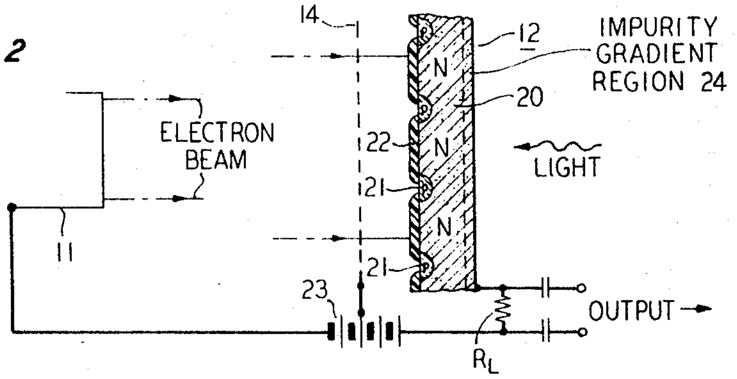

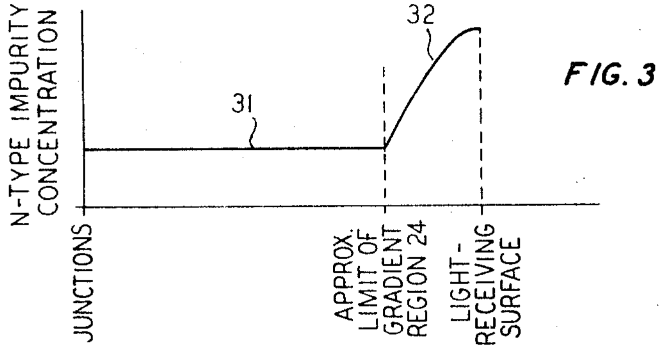

FIG. 3

FIG. 4

| WAFER INITIAL RESIS. Ω-CM. | DIFF. TEMP. °C | DIFF. TIME MINUTES | IMPURITY GRAD. REGION SHEET RESIS. Ω/SQUARE | DIFFUSED REGION DEPTH MICRONS | SURFACE CONCENTRATION CARRIER/$CM^3$ |
|---|---|---|---|---|---|
| 10 | 1050 | 5 | 10 | 0.5 | $4.8 \times 10^{21}$ |
| 10 | 925 | 25 | 17 | 0.6 | $1.1 \times 10^{21}$ |
| 10 | 850 | 30 | 50 | 0.4 | $6.0 \times 10^{20}$ |
| 10 | 800 | 30 | 100 | 0.2 | $3.2 \times 10^{20}$ |
| 10 | 750 | 30 | 600 | 0.1 | $8.7 \times 10^{19}$ |

INVENTORS T. M. BUCK
J. V. DALTON
BY
Wilford L. Wisner
ATTORNEY

United States Patent Office 3,458,782

Patented July 29, 1969

3,458,782

ELECTRON BEAM CHARGE STORAGE DEVICE EMPLOYING DIODE ARRAY AND ESTABLISHING AN IMPURITY GRADIENT IN ORDER TO REDUCE THE SURFACE RECOMBINATION VELOCITY IN A REGION OF ELECTRON-HOLE PAIR PRODUCTION

Thomas M. Buck, Basking Ridge, and John V. Dalton, Oldwick, N.J., assignors to Bell Telephone Laboratories, Incorporated, Murray Hill, N.J., a corporation of New York Filed Oct. 18, 1967, Ser. No. 676,197
Int. Cl. H01l *11/00, 15/00, 3/00*
U.S. Cl. 317—235 3 Claims

ABSTRACT OF THE DISCLOSURE

There is disclosed a silicon diode array target for an electron beam charge storage device such as a camera tube or scan converter. The diodes are maintained normally reversed-biased by the reading electron beam and are partially discharged, to achieve charge storage, in response to incident light photons or energetic electrons that produce electron-hole pairs in the substrate, the minority carriers then diffusing to the junction. The surface recombination velocity near the region of electron-hole pair production is reduced by establishing an appropriate impurity gradient in that region.

BACKGROUND OF THE INVENTION

This invention relates to diode array targets for electron beam charge storage devices such as camera tubes and scan converters.

For various uses in television or in television-telephone communications, it has been found that camera tubes and scan converters can employ, in place of the usual vidicon type structure (a continuous film of antimony trisulfide), a target which is basically a semiconductor wafer having a closely spaced array of p–n junctions near one surface. Information is stored by means of the partial discharging of a reverse bias of the junctions. Minority carriers are produced in the substrate and are effective to partially discharge the reverse bias of the junctions; and the reverse bias is periodically re-established by a reading electron beam.

An intensive effort has been made to improve the sensitivity of such devices. It has been found that sensitivity is dependent upon the degree to which electron-hole pairs are successfully produced by incident light photons or energetic electrons near a receiving surface of the wafer and the degree to which the minority carriers among them succeed in diffusing to the p–n junctions, which are near the opposite surface of the wafer.

In order for the minority carriers to arrive at the junctions, they must have escaped recombination at various recombination centers that exist near the receiving surface just beneath which they were generated, and they must have diffused a distance approximately equal to the thickness of the wafer without recombination in the bulk of the wafer.

A convenient parameter associated with the surface recombination is the surface recombination velocity, S. High values of this velocity are associated with a high probability of recombination at the recombination centers; and low values of this velocity are associated with low probability of recombination of the electron-hole pairs at those centers. It is defined by the expression $J=S\Delta p$, where J is the rate at which carriers flow to the surface and recombine and $\Delta p$ is change in charge carrier concentration resulting from electron-hole pair production.

Previous efforts to reduce the surface recombination velocity have employed several approaches. First, it was found that certain chemical treatments, e.g., soaking in hydrofluoric acid, can lower S on a silicon surface principally by bending the energy bands at the surface so as to repel holes. But this treatment is rather unstable and requires very careful atmospheric control. Then, it was found that a steam grown oxide layer upon the light-receiving surface would reduce the surface recombination velocity from about $10^7$ centimeters per second to about $10^3$ centimeters per second. An efficiency of almost fifty percent for blue light can be obtained in this way. Nevertheless, the oxide layer is somewhat unreliable and subject to deterioration during baking of the tube and continued use. Furthermore, the oxidation process on an otherwise completed target often degrades the diodes, increasing their leakage current. It has also been proposed that a suitably biased electrode, which can be called a field-effect electrode- can promote the diffusion of the minority carriers toward the junctions, or at least can separate the produced electrons and produced holes so that their probability of recombination is reduced. Such a field-effect electrode entails additional complication in the structure and causes additional attenuation of the incident light or energetic electrons, so that a smaller proportion thereof is available to produce electron-hole pairs. Thus, an improved technique for reducing surface recombination velocity in a diode array electron beam storage target is clearly desirable.

SUMMARY OF THE INVENTION

We have discovered that the surface recombination velocity of the light-receiving or energetic-electron-receiving surface of the silicon diode array target can be effectively reduced by means of a gradient of impurity concentration extending throughout a local region of the target. It has been further found that an impurity concentration gradient according to our invention not only causes a lowering of surface recombination velocity by repelling minority carriers from the light-receiving or energetic-electron-receiving surface, thereby causing them to diffuse toward the nearest diode junctions, but also facilitates the making of an ohmic contact to the wafer. The process of impurity diffusion that produces the gradient has the collateral effects of improving the bulk properties of the wafer and reducing diode leakage. The mechanisms of the latter effects are not completely understood but are probably due to removal of impurities such as copper and gold from the bulk silicon.

In particular, we have found that the wafer, considered as a whole, should have an initial resistivity between about 0.1 ohm-centimeter and 10 ohm-centimeters. After diodes are formed near one surface, the wafer should be diffused in a separate energy-receiving region including the opposite surface with a dopant impurity, for example, phosphorus, for an *n*-type silicon wafer, to produce a sheet resistivity of this region between approximately 10 and 600 ohms per square. This region is less than a micron thick.

The finished sheet resistivity of the impurity gradient region and, probably, initial resistivity of the substrate are significantly higher than in prior art semiconductor devices for which an impurity gradient was originally proposed. Such devices were suggested by A. R. Moore et al., Proceedings of the I.R.E., volume 43, page 427, 1955, but never successfully demonstrated. We believe, without wishing to be limited by this theory, that the failure of Moore and Webster may have been due to a damaged layer formed by their doping levels and process.

The arrangement of our target structure is such that the diffused region is separated from the regions scanned by the reading electron beam by a depletion region and a zero field region of uniform doping. This separation contributes to the success of the target structure. We have obtained surface recombination velocities apparently as low as 50 centimeters per second and have hole diffusion lengths for a silicon wafer that exceed the target thicknesses. We have also found that the efficiency is fairly flat over the entire visible region of the spectrum.

BRIEF DESCRIPTION OF THE DRAWINGS

Further features and advantages of our present invention may be apprehended from the following detailed description, taken together with the drawing, in which:

FIG. 1 is a pictorial cross-sectional view of a typical electron beam camera tube including a target structure according to our invention;

FIG. 2 is a pictorial cross section of the target structure together with a schematic showing of pertinent associated circuitry;

FIG. 3 shows a curve that illustrates the impurity concentration gradient in the target structure of FIG. 2; and FIG. 4 shows a table of examples illustrative of some ranges of parameters usable in the target structure of FIG. 2.

DESCRIPTION OF ILLUSTRATIVE EMBODIMENTS

In FIG. 1, the camera tube is similar in most respects to the typical vidicon camera tube used in television systems except for the characteristics of the target 12. The camera tube illustratively includes a lens 15 for imaging a scene through the transparent face plate 16 upon one surface of the target 12 and further includes means for supplying a reading electron beam and scanning it over the opposite face of the target 12. Thus, the tube includes the cathode 11, collimating, focusing, and accelerating electrodes and suitable magnetic deflection yokes 13. It also includes a grid 14 for collecting electrons that are secondarily emitted from the target 12 by impact of the reading electron beam.

With reference to FIG. 2, it may be seen that the target 12 comprises an n-type silicon wafer 20 into which the p-regions 21 have been diffused through a regular array of holes in a silicon dioxide insulating layer 22 on the reading electron beam surface of the target. This entire surface could optionally be covered with a semi-insulating layer as disclosed in the copending patent application of M. H. Crowell, J. V. Dalton, E. I. Gordon and E. F. Labuda, Ser. No. 641,257, filed May 25, 1967, and assigned to the assignee hereof. The p-type regions 21 are illustratively about 8 microns in diameter and are spaced about 20 microns center to center. The reading electron beam is typically broad enough to impinge on several p-regions 21 simultaneously. The wafer 20 includes the impurity gradient region 24 near the light-receiving surface. The interior boundary of the region 24 is indicated schematically by the vertical dotted line in the wafer 20.

The ohmic contact that permits output pulses to be abstracted from the device is illustratively made to the region 24 and is connected through the output load resistance $R_L$ and the biasing battery 23 to the cathode 11 of the electron beam device. The grid 14 is illustratively connected to a positive potential point of the biasing source 23 in order to collect secondarily emitted electrons.

The impurity gradient within the region 24 is illustrated by curve 32 of FIG. 3. The region 24 begins at a point in the wafer 20 at which the impurity concentration starts to rise sharply. The impurity concentration below this plane, as shown by curve 31 of FIG. 3, is substantially the same as that existing before the impurity gradient is created in region 24 and is substantially uniform. Thus, a region of uniform doping separates region 24 from the diode junctions. The impurity concentration in region 24 rises from a low value at its interior boundary to its highest concentration at the light-receiving surface of the wafer 20. The relationship of the finished sheet resistivity of the gradient region 24 to the initial or starting sheet resistivity of region 24 may be explained with reference to the table of FIG. 4.

The region 24 is characterized most readily by its sheet resistivity, in ohms per square, for the following reasons. The impurity concentration, and hence the conventional resistivity, of region 24 is nonuniform in this situation. Sheet resistivity allows us to treat an entire sheet of material of given thickness as a whole, while simultaneously permitting us to take account of its shape, that is, its ratio of length to width. The resistance in ohms of the region between any two electrodes attached to opposite edges thereof is simply the sheet resistivity times the number of squares, defined as the distance between the electrodes divided by the width of the electrodes in the plane of the sheet and orthogonal to the shortest line between them.

The preferred example is the third one in the table; and, it yielded an efficiency of nearly fifty percent from 0.45 to 1.0 microns, which encompasses the visible region. In other words, nearly half of the minority carriers produced by incident light at all visible wavelengths succeeded in diffusing to the p-n junctions. The initial resistivity of 10 ohm-centimeters corresponds to an initial charge carrier concentration of about $5\times10^{14}$ per cubic centimeter or to an initial sheet resistivity of about 4000 ohms per square in a wafer one mil (25 microns) thick. After the phosphorus diffusion, the concentration at the outer surface of region 24 is about $6\times10^{20}$ carriers per cubic centimeter, estimated by calculation based on the measured sheet resistivity and depth of the gradient region.

For efficiency greater than 20 percent, the parameters can encompass the second through the fourth examples. Thus, a useful intermediate range of finished sheet resistivity of the impurity gradient region 24 is from 17 ohms per square to 100 ohms per square. For efficiency greater than one percent, all five examples are usable.

For certain applications, such as scan converters, it may be desirable to employ a lower initial resistivity of the wafer, such as one ohm-centimeter or 0.1 ohm-centimeter. The usable range of parameters of the diffused region for a given efficiency is substantially narrowed as initial resistivity is lowered. The finished sheet resistivity of region 24 should not be allowed to fall below about 10 ohms per square, but the upper limit of the range of finished sheet resistivity decreases substantially as initial resistivity decreases. For one ohm-centimeter initial resistivity of the wafer, the usable range of finished sheet resistivity of the region 24 extends to about 100 ohms per square. For one-tenth ohm-centimeter initial resistivity of the wafer, the usable range of finished sheet resistivity of region 24 extends to about 20 ohms per square.

It should be understood that, in any event, the region 24 is much thinner than the wafer (less than one micron as compared to 25 microns, respectively) so that a relatively light phosphorous diffusion produces a substantial gradient of impurity concentration. By light diffusion, we mean that it is much briefer and at lower temperatures than would normally be used in preparing a semiconductor device for an ohmic contact.

In operation, the camera tube of FIG. 1, including the target 12 as detailed in FIG. 2, produces a sequence of output pulses representative of the input light image. The electron beam initially establishes and periodically reestablishes a reverse bias of the p-n junctions in the target 12 which is substantially equal to the voltage of source 23. Information is then written into the diode array by a pattern of light photons, which are absorbed primarily in the region 24 to produce a corresponding pattern of concentration of electron-hole pairs. The impurity gradient region 24 creates a small field that is effective to repel the produced holes before they have a chance to recombine at certain defects and lattice points known as recombination centers at the surface. The holes are the minority carriers; and a very large proportion of them succeed in diffusing to the p-n junctions formed at regions 21. There they partially discharge the reverse bias of the inherent junction capacitances in proportion to the light intensity that created them. Since the holes tend to diffuse predominantly to the nearest p-n junctions, the pattern of the input light image is preserved as a pattern of varying degrees of discharge of the inherent capacitances of the reversed-biased p-n junctions. The next scan by the reading electron beam will recharge the inherent capacitance of each p-n junction to its full-reverse-biased condition and will produce a pulse of output current through resistance $R_L$, which pulse has an amplitude-width product directly related to the degree of discharge of the p-n junction. Therefore, the sequence of output pulses representing an entire frame of scanning by the electron beam will represent the entire light image that was focused upon the light-receiving surface of target 12.

For a device designed for sensitivity in the visible and near infrared portion of the spectrum, the target structure 12 is typically made as follows: a slice of monocrystalline n-type silicon, 0.5 to 15 mils thick, is polished to form the substrate 20, then oxidized to form a layer of silicon dioxide in which an array of apertures 8 microns in diameter, 20 microns center-to-center, is etched using conventional photolithographic masking and etching techniques. The layer of silicon dioxide so etched forms the oxide coating 22. Boron is diffused into the exposed areas of the substrate 20 under appropriate diffusion conditions to form the p-type regions 21, with the oxide coating 22 acting as a diffusion mask. Any boron glass or impurity layer that forms on the oxide coating is removed with a suitable solvent or etchant. The impurity gradient region 24 is then formed by diffusing phosphorus from a phosphorus containing source compound, such as $PBr_3$ plus nitrogen and a trace $O_2$, or from elemental phosphorus into the substrate 20 at a temperature and for a time as set out in the table of FIG. 4, except that the extreme temperatures are avoided for lower resistivity starting material; and any resulting glass or impurity layer is then removed from the oxide coating 22 with a suitable solvent. A good contact, to which load resistor $R_L$ can be connected, is then made to region 24 either by vacuum-evaporating gold thereon or by directly contacting the phosphorous-doped substrate.

It should be apparent that a number of modifications of the present invention are possible within the scope of our teaching. For example, the preferred impurity gradient can be achieved with compensating variations of diffusion temperature and time, as is well known in the art. Moreover, variations of one or both of the diffusion parameters allow us to select a different finished sheet resistivity within the limits discussed above.

As mentioned heretofore, the electron-hole pairs can be created by energetic electrons as well as by light. Whether produced in a pattern from a photoemitter or supplied in a scanned writing electron beam as in a scan converter, the electrons should be accelerated so that each produces a plurality of electron-hole pairs in the impurity gradient region 24.

While the preferred embodiment of the invention employs an n-type silicon wafer, other semiconductors could be employed, and p-type wafers into which n-type regions are diffused to form the p-n junctions could also be employed. When the substrate of the wafer 20 is p-type, a suitable acceptor impurity will be used for the diffusion to create the gradient region 24. As explained in the copending patent application of T. M. Buck, M. H. Crowell and E. I. Gordon, Ser. No. 605,715, filed Dec. 29, 1966, and assigned to the assignee hereof, the reverse-biasing of the p-n junctions in a target 12 of which the substrate is p-type can be achieved by means of secondary electron emission.

It should be further understood that an anti-reflection coating could be deposited over the light-receiving surface of the impurity gradient region 24.

It should be understood that, while the impurity gradient region 24 has been characterized in part in terms of sheet resistivity, these units are merely a convenience. In any event, the region could be characterized in a number of equivalent ways.

We claim:

1. A charge storage device of the type comprising:

a target structure comprising a semiconductor wafer and including a plurality of p–n junctions near a first surface thereof, means for reverse-biasing the p–n junctions comprising means for periodically scanning said first surface with an electron beam, and means for producing minority carriers in said wafer whereby the reverse bias can be partially discharged by diffusion of said minority carriers to said junctions, said device being improved in promoting the diffusion of the minority carriers to the junctions, in that said wafer has a first region of substantially uniform resistivity of at least approximately 0.1 ohm-centimeter adjacent said junctions and a second region separated from said junctions by said first region and having a sheet resistivity between approximately 10 and 600 ohms per square, said wafer having a decreasing concentration of a dopant impurity extending inwardly from a surface of said region and reducing the recombination velocity for electrons and holes near said surface.

2. A charge storage device according to claim 1 in which the means for producing minority carriers comprises means for directing light or electrons into said region to produce electron-hole pairs therein, said region being diffused with a donor impurity to obtain a sheet resistivity between approximately 10 ohms per square and a higher value that is directly related to the initial sheet resistivity and is less than 600 ohms per square.

3. A charge storage device according to claim 2 in which the wafer is n-type silicon having a plurality of p-regions near the first surface and the donor impurity in the diffused region is phosphorus.

References Cited

UNITED STATES PATENTS

| | | | |
|---|---|---|---|
| 3,403,284 | 9/1968 | Buck et al. | 315—11 |
| 3,403,278 | 9/1968 | Kahng et al. | 313—65 |
| 3,351,828 | 11/1967 | Beale et al. | 317—235 |
| 3,401,294 | 9/1968 | Crichi et al. | 313—68 |

JOHN W. HUCKERT, Primary Examiner

B. ESTRIN, Assistant Examiner

U.S. Cl. X.R.

250—211; 313—65, 68; 315—11, 21; 317—234